Dec. 4, 1962 F. S. SAUNDERS 3,066,399
APPARATUS FOR ASSEMBLING DAMPERS
Filed Feb. 19, 1960 8 Sheets-Sheet 1

FIG. 1

INVENTOR.
FRED S. SAUNDERS
BY
Lockwood, Woodard, Smith & Weikart
ATTORNEYS

Dec. 4, 1962 F. S. SAUNDERS 3,066,399
APPARATUS FOR ASSEMBLING DAMPERS
Filed Feb. 19, 1960 8 Sheets-Sheet 3

FIG. 3

INVENTOR.
FRED S. SAUNDERS
BY
Lockwood, Woodard, Smith & Weikart
ATTORNEYS

Dec. 4, 1962 F. S. SAUNDERS 3,066,399
APPARATUS FOR ASSEMBLING DAMPERS
Filed Feb. 19, 1960 8 Sheets-Sheet 4

FIG. 4

INVENTOR.
FRED S. SAUNDERS
BY
Lockwood, Woodard, Smith & Weikart
ATTORNEYS

Dec. 4, 1962    F. S. SAUNDERS    3,066,399
APPARATUS FOR ASSEMBLING DAMPERS
Filed Feb. 19, 1960    8 Sheets-Sheet 5

FIG. 4A

INVENTOR
FRED S. SAUNDERS
BY
Lockwood, Woodard, Smith & Weikart
ATTORNEYS

Dec. 4, 1962  F. S. SAUNDERS  3,066,399
APPARATUS FOR ASSEMBLING DAMPERS
Filed Feb. 19, 1960  8 Sheets-Sheet 6

FIG. 4B

INVENTOR.
FRED S. SAUNDERS
BY
*Lockwood, Woodard, Smith & Weikart*
ATTORNEYS Dec. 4, 1962  F. S. SAUNDERS  3,066,399
APPARATUS FOR ASSEMBLING DAMPERS
Filed Feb. 19, 1960  8 Sheets-Sheet 7

INVENTOR.
FRED S. SAUNDERS
BY
Lockwood, Woodard, Smith & Weikart
ATTORNEYS

Dec. 4, 1962  F. S. SAUNDERS  3,066,399
APPARATUS FOR ASSEMBLING DAMPERS
Filed Feb. 19, 1960  8 Sheets-Sheet 8

INVENTOR.
FRED S. SAUNDERS
BY
Lockwood, Woodard, Smith & Weikart
ATTORNEYS

United States Patent Office 3,066,399
Patented Dec. 4, 1962

3,066,399
APPARATUS FOR ASSEMBLING DAMPERS
Fred S. Saunders, Indianapolis, Ind., assignor to Schwitzer Corporation, Indianapolis, Ind., a corporation
Filed Feb. 19, 1960, Ser. No. 9,752
7 Claims. (Cl. 29—235)

This invention relates to an apparatus for assembling an elastic member in a compressed state between a pair of spaced members and finds a primary utility as an apparatus for assembling a damper which includes a pair of spaced annular sleeves or ring-shaped members having an annular elastic element compressed therebetween.

The present invention contemplates an apparatus in which a pair of rings are mounted in spaced concentric relation in a fixture. After lubricant has been applied to the surfaces of the elastic element, axial force is exerted thereon to force the elastic element between the sleeves or rings and one of the sleeves or rings is oscillated simultaneously with the application of the axial force. Such simultaneous force and oscillation causes a slippage between the elastic element and the confining surfaces of the sleeves or rings whereby the bushing is moved into place. The simultaneous application of axial force and oscillation also relieves stresses such as would otherwise cause the sleeves or rings to be eccentric with respect to each other after completion of the assembly.

Because of the fact that in different applications different dampers are required having various sizes and shapes, the oscillating forces used in operating the assembly apparatus must be of different types. It is, therefore, one object of the present invention to provide an improved apparatus capable of assembling various sized elastic elements between a pair of concentric sleeves which have various shapes and contours. For example, the sleeves may have an elliptically shaped space therebetween or, alternatively, may have a space therebetween which is curved in the direction of the axes of the concentric members. The present invention accomplishes this object at least in part by providing means for controlling the torque, speed, and amplitude of the oscillating forces applied to one of the concentric rings.

A further object of the present invention is to provide an apparatus for assembling an elastic bushing in a compressed state between a pair of spaced concentric sleeves, the apparatus including means for ejecting the finished assembly.

Still another object of the present invention is to provide an apparatus for assembling an elastic bushing in a compressed state between a pair of spaced concentric sleeves, the apparatus including improved means for clamping and positioning the outer sleeve in concentric relation to the inner sleeve.

A further object of the present invention is to provide an apparatus of the above mentioned character including alternatively operable means for clamping the inner sleeve in concentric relation and for ejecting the finished assembly.

Related objects and advantages will become apparent as the description proceeds.

In accordance with the present invention, there is provided an apparatus for assembling an elastic member in a compressed state between a pair of spaced members having coaxial surfaces, the apparatus comprising supporting means for each of the spaced members for positionng them in spaced relation. Means are also provided for aligning the elastic member with the space between the spaced members and for guiding the elastic member into the space. A punch is arranged to be engageable with said elastic member for forcing the elastic member between the spaced members. There is further provided means for oscillating one of the supporting means with respect to the other supporting means about the axes of said surfaces, the means for oscillating being adjustable to oscillate said one supporting means at a desired torque, speed, and amplitude.

The full nature of the invention will be understood from the accompanying drawings and the following description and claims.

Figure 1:
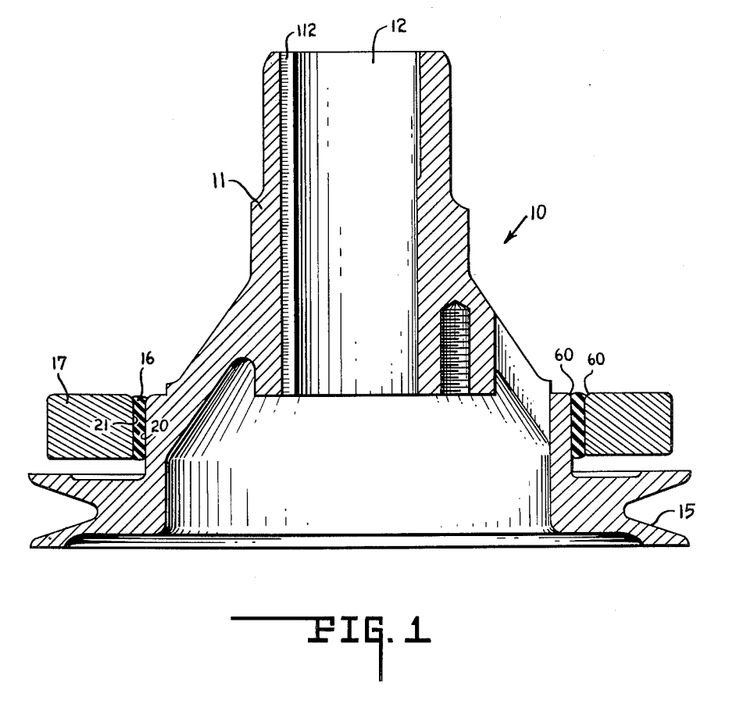
FIG. 1 is a section taken along the axis of one form of damper assembly assembled by the apparatus embodying the present invention.

Referring now to the drawings and more particularly to FIG. 1, the present invention comprises an apparatus for assembling dampers such as the damper 10 illustrated in FIG. 1. The damping device 10 includes a driving member or sleeve 11 having a concentric bore 12 proportioned to receive a crankshaft or other rotatable shaft to be damped. Depending upon the particular application for which the damper is to be used, the driving member 11 may be provided with a peripheral pulley groove 15. For example, if the shaft to be damped is the crankshaft of a reciprocating engine of an automobile, the pulley groove 15 may be used in driving the generator and/or the fan belt of the automobile.

Concentrically mounted upon the driving member 11 by means of an elastic element or bushing 16 is an inertia member or ring 17. The inertia member is retained upon the driving member at least partly by means of a precompression stress within the elastic element. In other words, the initial uncompressed thickness of the elastic member 16 is substantially greater than the spacing between the mutually facing surfaces 20 and 21 of the driving member and inertia member, respectively. As the driving member receives vibrations from the shaft to be damped, the inertia member and the elastic member cooperate to absorb and damp these vibrations.

It is highly desirable that the elastic member be assembled in such a manner that it has uniform stresses throughout. This is accomplished by arranging the driving member and the inertia member in a concentric spaced relationship and by forcing the elastic member between the driving and inertia members and simultaneously oscillating the driving member. Depending upon the size and characteristics of the particular damper to be produced, it is highly desirable that the oscillation be accomplished at a predetermined torque, speed, and amplitude.

Figure 2:
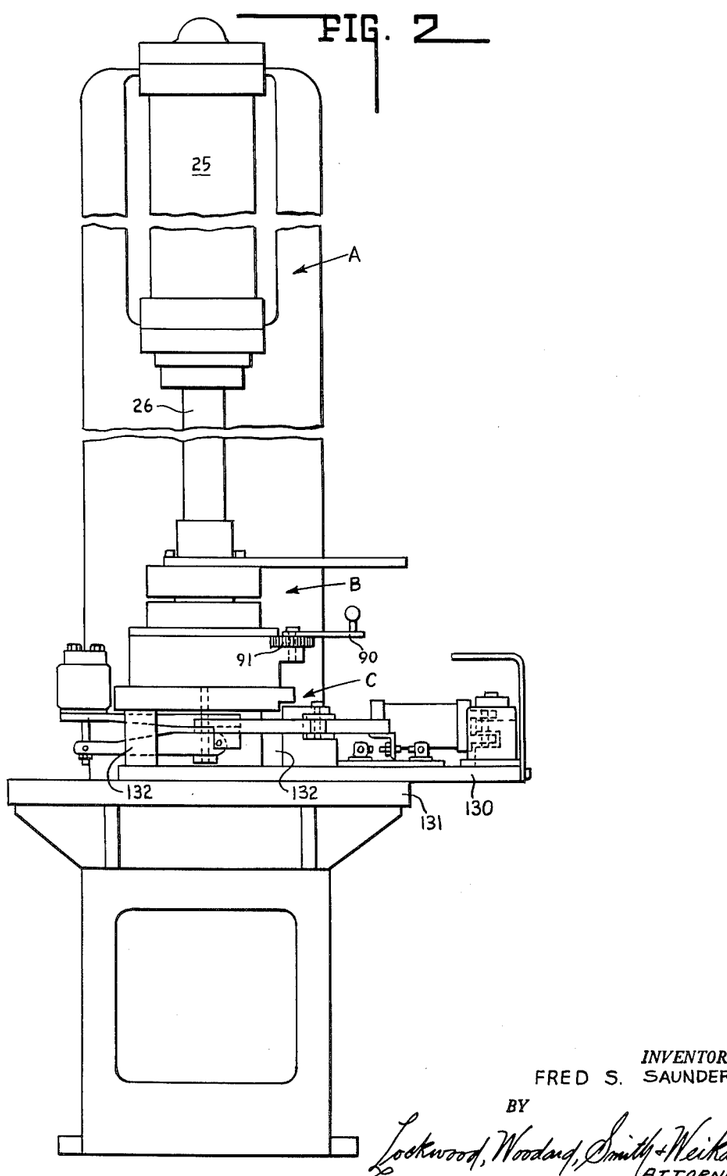
FIG. 2 is a front elevation of a damper assembling apparatus embodying the present invention.

The apparatus of the present invention incorporates means for accomplishing these steps automatically and in a most efficient and facile manner. Referring now to FIG. 2, there is illustrated a damper assembling apparatus which is made up in general of three units, A, B, and C. Unit A includes a hydraulic cylinder 25 having a ram 26 operatively associated therewith. The hydraulic cylinder is controlled by a commercially available control system arranged to cause the ram to travel at a predetermined speed when moving upwardly and downwardly and also to cause the ram to deliver a controlled axial force in a downward direction. This downward force is delivered by apparatus described below to the elastic member whereby it is forced between the concentrically located inertia and driving members.

Unit B includes apparatus for positioning and clamping the driving and inertia members concentrically with respect to one another and in the proper axial location. Unit B also includes an air operated mechanical lifter means to assist in removal of the assembled damper from the apparatus. Unit B is arranged to be interchangeable with other units which function similarly but accommodate dampers of different dimensions and contours.

Unit C includes apparatus for oscillating the driving member with respect to the inertia member. The apparatus is so arranged that this oscillation occurs simultaneously with the axial force exerted against the elastic member by means of the ram 26. Unit C also includes means for controlling the torque, amplitude, and speed of the oscillation applied to the driving member. The clamping force used to hold the driving member in place is also provided by suitable means incorporated within Unit C and also within Unit B.

*Hydraulic Ram and Control System (Unit A)*

As has been mentioned, Unit A includes a hydraulic cylinder 25. This cylinder is equipped with a motor-driven pump (not shown) which furnishes the force to move the ram downwardly and upwardly. The fluid from this pump passes through a plurality of valves (not shown), one of which controls the pressure that the ram will deliver. Another of the valves controls the speed at which the ram will travel in either its upward or downward movement. Still a further one of the valves controls the direction (either upwardly or downwardly) of the ram. This last mentioned valve may be set in a neutral position in order that the ram may be stopped at any position in its downward or upward movement. Thus, the ram may be stopped at a required height for loading driving, inertia, and elastic members in Unit B and for unloading assembled dampers from Unit B.

*Locating, Clamping, and Lifting Device (Unit B)*

Figure 3:
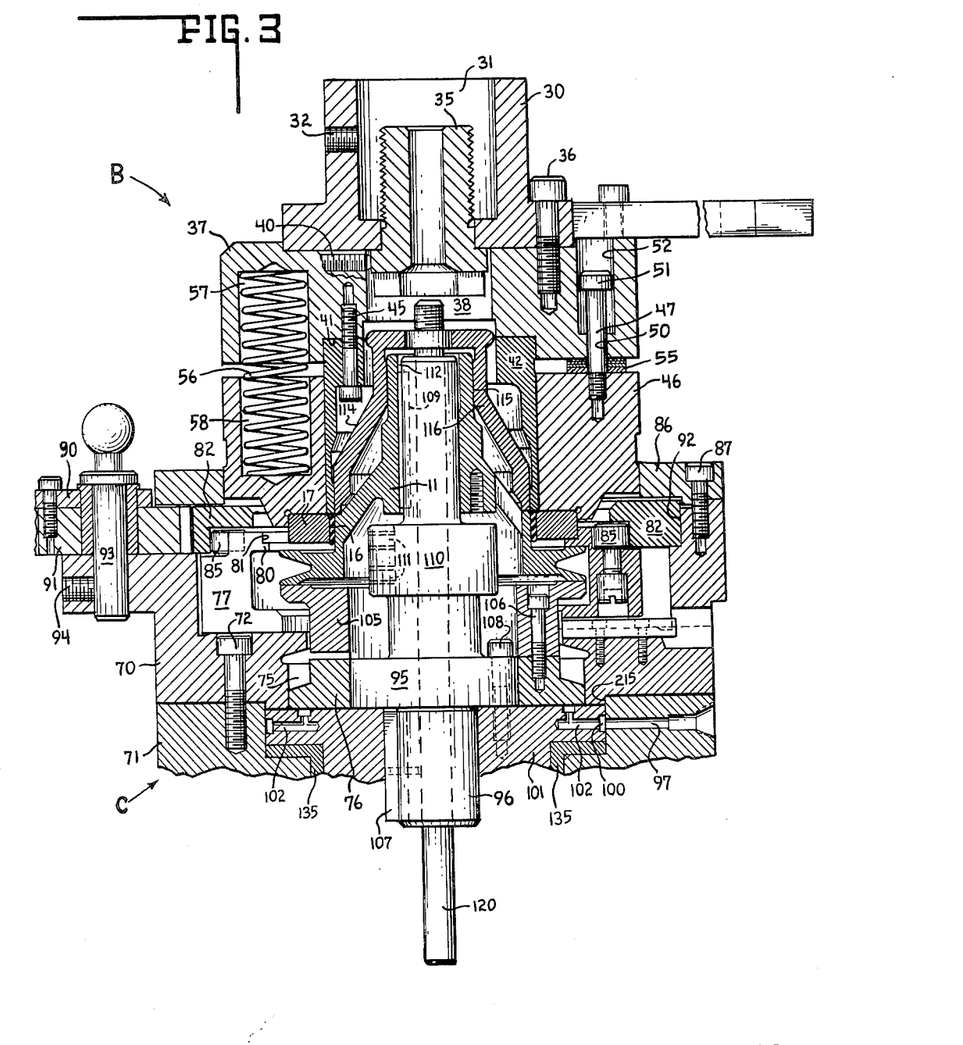
FIG. 3 is an enlarged fragmentary vertical section of a central portion of the structure illustrated in FIG. 2.

Unit B is made up of two sub-units, one of which is attached to the lower end of the ram 26 and the other of which is attached to Unit C. Referring to FIG. 3, the ram portion of Unit B includes an adapter 30 having a concentric bore 31 therein for reception of the lower end of the ram 26. The adapter 30 is positioned on the lower end of the ram by means of the bore 31 and is attached to the ram by means of a screw extending through a threaded bore 32 in the adapter and by means of a screw 35 which is seated within a suitable concentric aperture in the adapter and extends concentrically into the bore 31.

The adapter 30 is fixed by means of a plurality of screws 36 (only one shown, the screws being arranged in a concentric pattern about the axis of the adapter 30) to a generally annular member 37 having a central bore 38 into which the head of the screw 35 extends. The screw 35 is locked against rotation with respect to the adapter 30 and the member 37 by means of a screw 40 threadedly received within a suitably tapped bore within the member 37. The member 37 is counterbored at 41 to form a central annular piloting recess for reception of a punch ring 42 which is fixed within the counterbore 41 by means of a plurality of screws 45 (only one of which is shown).

A clamping or hold-down ring 46 is arranged concentrically of the member 37, adapter 30, and the punch ring 42 and is reciprocal axially of the punch ring. A plurality of bolts 47 (only one shown) are reciprocally received within suitable bores 50 and have their heads 51 received within concentric counterbores 52. The bolts 47, which are threadedly fixed within the clamping ring 46, provide means for limiting the downward movement of the clamping ring 46 with respect to the punch ring 42. The downward movement of the punch ring with respect to the clamping ring is limited by a plurality of shims 55 received about the bolts 47 and between the annular member 37 and the clamping ring 46.

A plurality of pre-loaded springs 56 are arranged in a concentric pattern about the axis of the clamping ring and annular member 37 and are received within suitable recesses 57 and 58 in the member 37 and clamping ring, respectively. The springs 56 yieldably hold the clamping ring 46 in a downward position relative to the punch ring 42.

In operation, the ram 26 is moved downwardly until the clamping ring 46 engages the inertia member 17 so as to hold it in concentric relation to the driving member 11. As the ram continues downwardly, the punch ring moves downwardly within the clamping ring and forces the elastic element 16 between the driving and inertia members. By comparing FIGS. 3 and 4, it can be seen that the initial thickness of the elastic member is substantially greater than its final thickness in the assembled damper. In order to guide the elastic element between the inertia and driving members, the inertia member and the driving member are provided with chamfered surfaces 60. The punch ring 42 has a downwardly extending cylindrical shape at its lower end which is of substantially the same thickness as the initially uncompressed elatsic element.

The lower portion of Unit B is attached to Unit C and comprises a body 70 which is fixed to the top plate 71 of Unit C by means of a plurality of screws 72 (only one of which is shown). The body 70 is provided with a coaxial recess 75 which reciprocably receives a lifter ring 76, the function of which will be explained below. A number of supporting blocks 77 are slidably mounted within a suitable cavity in the body 70 and have inwardly extending projections 80 and recesses 81 adapted to engage the inertia member 17 and to space the inertia member from the driving member 11. These supporting blocks 77 may be moved inwardly for supporting the inertia member during the assembly of the damper and may be moved outwardly in order that the greater diameters of the driving member may pass the supporting blocks during unloading of the device.

The movement of each of the blocks 77 is controlled by a cam 82 which acts upon rollers 85 rotatably mounted on each of the blocks 77. A ring 86 is fixed to the body 70 by means of a plurality of screws 87 (only one of which is shown) and functions as a guide for the cam 82 and also for the clamping ring 46. The cam is provided with an operating lever 90 (FIGS. 2, 3, and 4) having gear wheel 91 fixed thereto and arranged to engage the cam 82 for rotation thereof. The gear wheel and lever are pivoted on trunnion 93 which is fixed to body 70 by a screw received in threaded bore 94 in the body. The cam 82 which is received within a recess 92 in the body 70 may be rotated one way or the other in the recess by means of the lever to move the blocks 77 inwardly or outwardly. The cam is used to move the blocks inwardly to a suitable position for approximately locating the inertia member 17. When the inertia member has been so positioned in its approximate location, the engagement of the inertia member by means of the clamping ring 46 will finally position the inertia member in its correct location for assembly of the damper.

The lifter ring 76, which is vertically reciprocal in the cylindrical opening 75, is closely fitted within that opening and around a radially extending collar 95 integral with and forming a part of a vertically extending post 96. When air is introduced under pressure into a passage 97 in the top plate 71, it forces against the lower surface of the lifter ring 76 moving it upwardly, the air passing through a peripheral groove 100 in an oscillating plate 101 forming a part of Unit C and through suitable conduits 102 extending radially inwardly from the peripheral recess 100. Thus, the lifter ring 76 may be used as an air piston for ejecting a finished damper assembly from the apparatus of the present invention.

Figure 4:
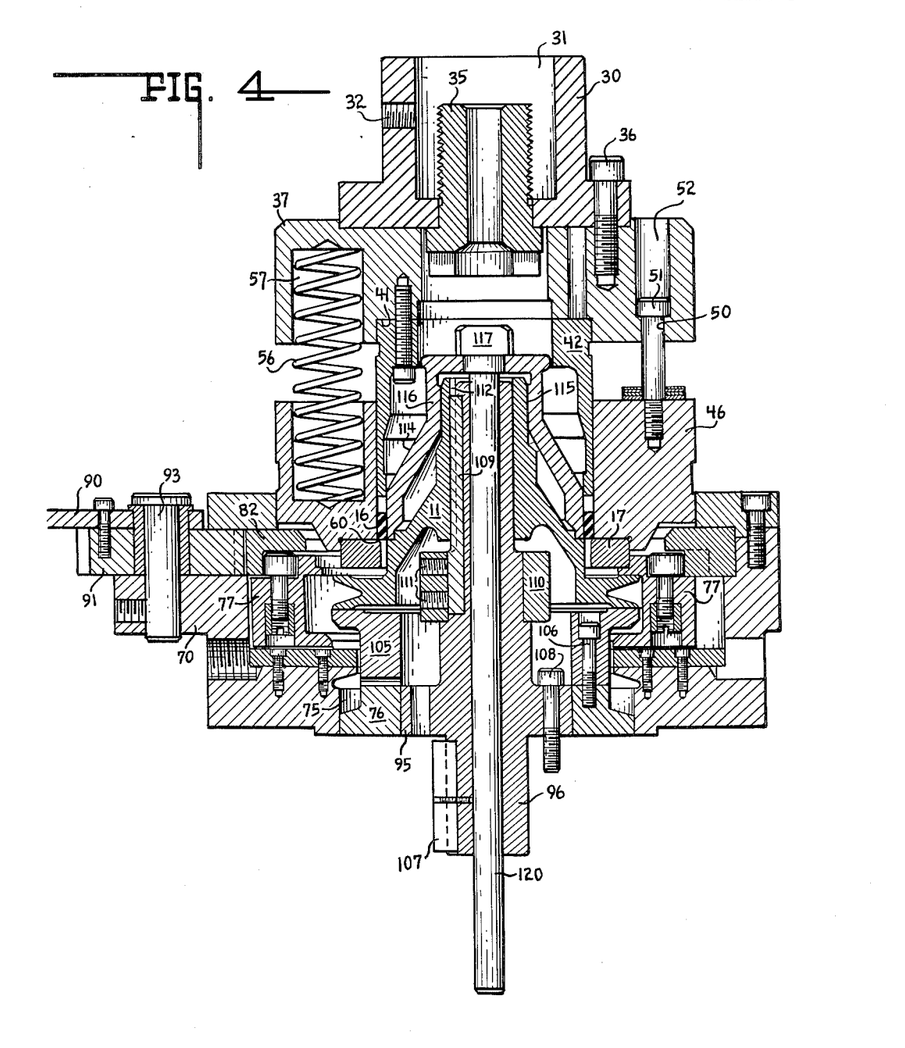
FIG. 4 is a view generally similar to FIG. 3 showing the apparatus in a different operating position.

An annular spacer member 105 is received concentrically about the vertical post 96 and is fixed to the lifter ring 76 by means of a plurality of screws 106 (only one of which is shown). The spacer 105 functions to position the driving element 11 in the correct axial location for the assembly of the damper. When the lifter ring 76 is abutting the oscillating plate 101, as illustrated in FIGS. 3 and 4, the spacer element 105 and the driving element 11 are correctly positioned for assembly of the damper.

The vertical post 96 is arranged concentrically of the oscillating plate 101 and is secured thereto by means of a key 107 and a plurality of screws 108. Thus, when the oscillating plate 101 is caused to oscillate in the manner described below, the vertical post 96 oscillates with the oscillating plate. The vertical post extends upwardly and is formed with a suitable keyway for reception of a key 109 (FIG. 4) which is fixed in position relative to the post by means of a ring 110 and by means of suitable screws threadedly received in bores 111 in the ring 110.

The driving element 11 is provided with a keyway 112 arranged for reception of the key 109 whereby the driving element 11 is secured for oscillation with the vertical post 96. It should be noted that the vertically extending post 96 is arranged coaxially with respect to the clamping ring 46. As has been mentioned above, the clamping ring 46 provides the final positioning of the inertia member 17. Since the bore 12 through the driving member 11 is positioned coaxially of the driving member, the reception of the driving member upon the vertical post 96 locates it in a position concentric to the inertia member 17.

The outer surface 115 of the driving member 11 is located concentrically with relation to the driving member and functions to concentrically position a generally annular, frustoconically shaped guide 116. The guide 116 is clamped downwardly upon the driving member 11 by means of a T-head 117 on the upper end of a concentrically located shaft 120 which extends axially of the vertical post 96. The lower portion of the guide 116 has an outer diameter which is slightly less than the diameter of the surface 20 (FIG. 1) of the driving member 11 and is equal to the smallest diameter of the chamfered portion 60 of the driving member. The guide 116, shaft 120 and T-head 117 thereon form a part of a clamping or holding means for positioning the driving element 11, the shaft 120 being moved downwardly by air actuated means described below in connection with Unit C.

The elastic element used in the present damper assembly has an initial radially extending shape and is deformed into the cylindrical shape of FIG. 4 by forcing the elastic element by hand over the generally frustoconical shaped portion 114 of the outer face of the guide 116 downwardly into the position illustrated in FIG. 4 wherein the lower end of the elastic element is flush with the lower end of the guide 116. This type of elastic element which has an initially radially extending shape is illustrated and described more thoroughly in the copending application of William J. Troyer entitled Method of and Apparatus for Making Vibration Damper, Serial Number 9,751. After the elastic element 16 has been positioned as illustrated in FIG. 4, the apparatus is in readiness for the assembly of the damper.

Figure 4A:
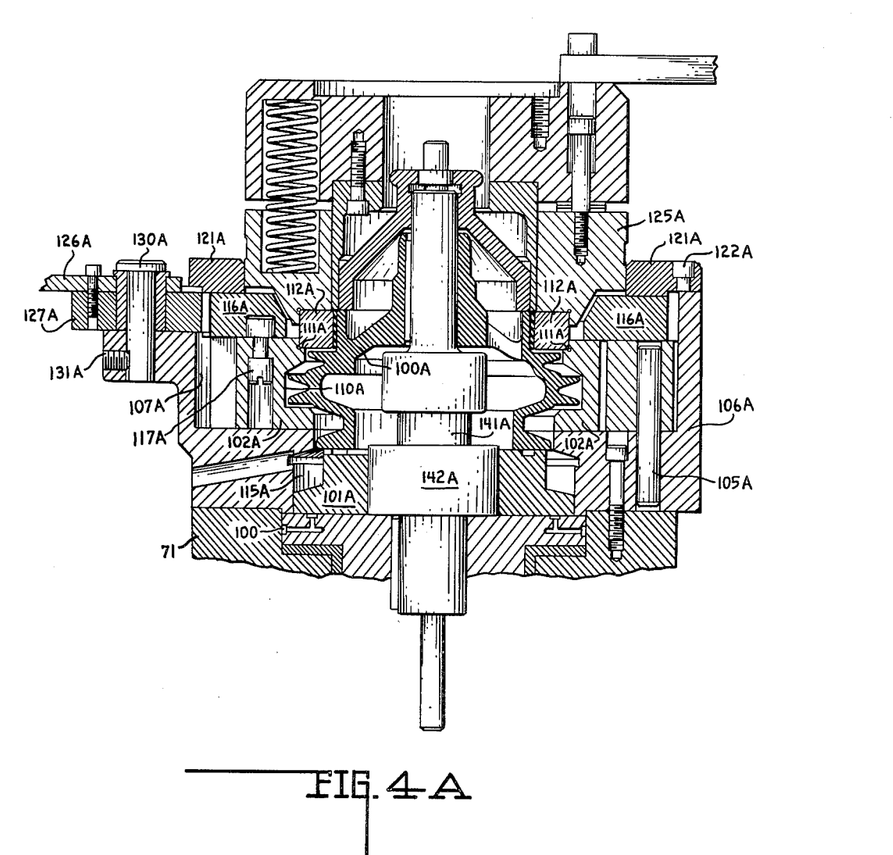
FIG. 4A is a vertical section similar to FIGS. 3 and 4 of an alternative embodiment of the invention.
Figure 4B:
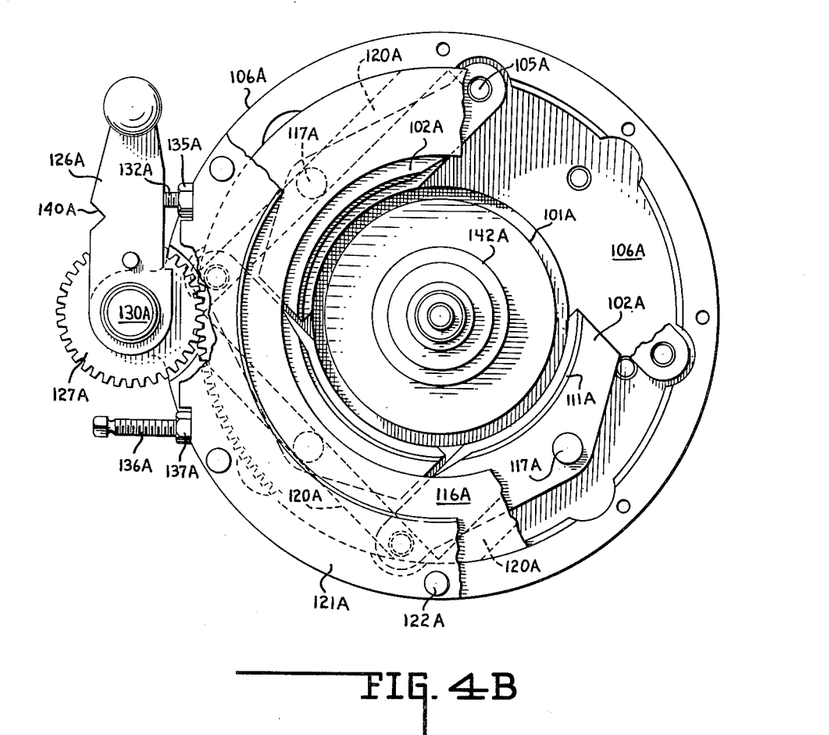
FIG. 4B is a fragmentary plan view of the lower portion of the structure of FIG. 4A, certain portions of the structure being broken away for clarity of illustration.
Figure 5:
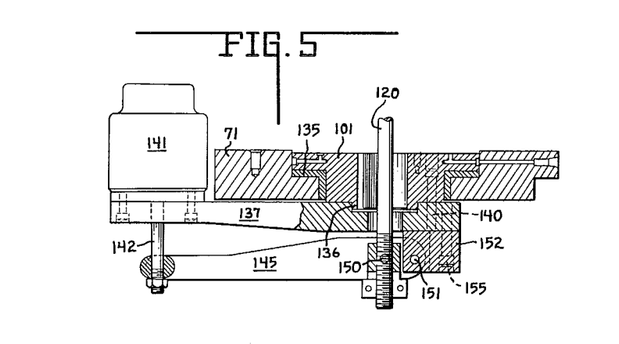
FIG. 5 is an enlarged fragmentary side elevation, partially in section, of a portion of the structure illustrated in FIG. 2.
Figure 6:
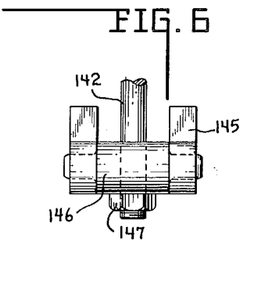
FIG. 6 is an enlarged end view of a portion of the structure illustrated in FIG. 5.
Figure 7:
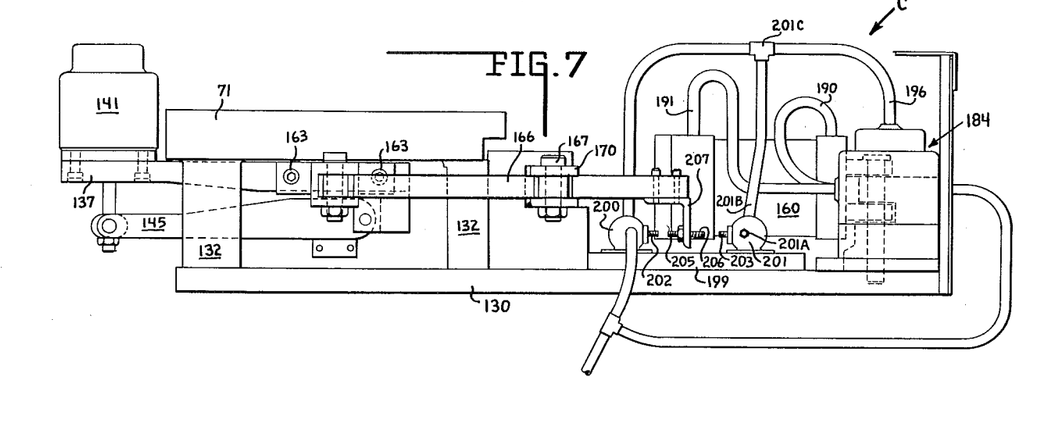
FIG. 7 is an enlarged front elevation of a portion of the structure illustrated in FIG. 2 and partially illustrated in FIG. 5.
Figure 8:
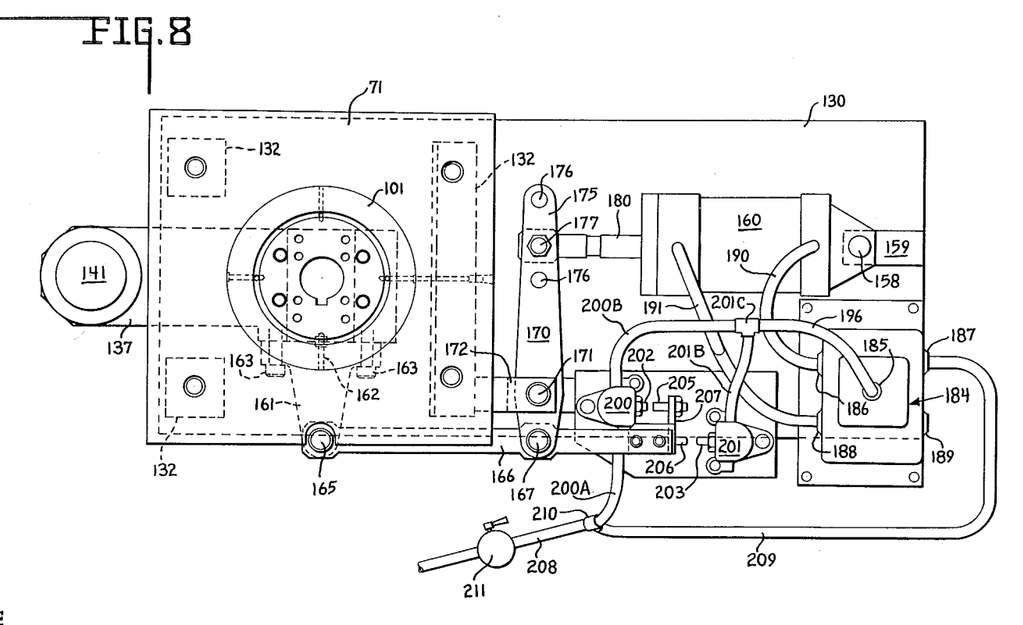
FIG. 8 is an enlarged top plan view of the structure illustrated in FIG. 7.

As has been pointed out above, Unit B of the present invention is interchangeable with other units similar to Unit B which function in like manner but accommodate dampers of other dimensions and contours. Referring to FIGS. 4A and 4B, there is illustrated an alternative embodiment of Unit B showing it mounted upon the top plate 71 of Unit C in a manner similar to the mounting of the above described Unit B. This alternative embodiment is the preferred embodiment and incorporates improved means over the structure of FIGS. 3 and 4 for supporting the inertia member and for spacing it in proper relation to the driving member during assembly.

It can be seen from FIG. 4A that the driving member 100A has different dimensions and contours than the driving member 11 above described. For this reason, the spacer 105 above described is not needed and the driving member 100A is supported directly upon the lifter ring 101A. A plurality of supporting blocks 102A are pivotally mounted by means of trunnion pins 105A upon a body 106A which is provided with a suitable coaxial recess 107A within which the blocks 102A are received. Similarly to the blocks 77 above described, the blocks 102A are formed suitably at their interior surfaces 110A to receive the driving member 100A of the damper assembly. Each of the blocks 102A is provided with a suitable recess 111A for engaging and supporting the inertia member 112A in correct coaxial and axial relation to the driving member 100A.

The blocks 102A may be swung inwardly about trunnion pins 105A for supporting the inertia member during the damper assembly and may be swung outwardly in order that the larger diameter of the driving member 100A may pass by the blocks during loading and unloading of the device. In order to unload a finished damper assembly from the device, the lifter ring 101A is caused to move upwardly within the concentric opening 115A within which it is received, this upward movement occurring as a result of the lifter ring acting as an air piston under the action of air under pressure passing into the passages 97, 100, and 102 as above described.

The movement of each of the blocks 102A is controlled by means of an annular cam 116A received within the concentric recess 107A above the blocks and arranged to act upon rollers 117A rotatably mounted upon each of the blocks 102A. The lower surface of the cam 116A has four elongated cavities 120A having straight side walls and arranged in a square shaped pattern on the lower surface of the cam 116A. The upwardly extending rollers 117A are received within these elongated cavities whereby, as the cam is rotated about its axis, the rollers 117A move within the cavities 120A causing the blocks 102A to be moved inwardly or outwardly. It can be seen that the manufacture of a cam such as the cam 116A, in which the camming surfaces are provided by straight elongated recesses extending completely through a member, is a relatively simple operation.

A ring 121A is fixed to the body 106A by means of a plurality of screws 122A and functions as a guide for the cam 116A (and also as a guide for the clamping ring 125A which is constructed and functions similarly to the clamping ring 46 above described). The cam 116A is provided with an operating lever 126A having a gear wheel 127A fixed thereto and arranged to engage the cam for rotation thereof. The gear wheel and lever are pivoted on a trunnion 130A which is fixed to the body 106A by a screw received in threaded bore 131A in the body. The cam may be rotated one way or the other in the recess 107A by means of the lever 126A to swing the blocks inwardly or outwardly.

An adjusting screw 132A is threaded within the body 106A and is locked in position by means of a nut 135A threadedly received upon the screw. The adjusting screw 132A functions to adjustably limit the inward swing of the blocks at a suitable position for approximately locating the inertia member 112A. During the operation of the device, the clamping ring 125A will move downwardly to finally position the inertia member 112A as above described in connection with the structure of FIGS. 3 and 4. The adjusting screw 132A accomplishes its function by limiting the movement of the operating lever 126A when the lever is moved in abutting relation to the screw as illustrated in FIG. 4B.

Another adjusting screw 136A is threadedly received within the body 106A and is locked in position by means of a nut 137A threadedly received upon the screw. The screw 136A functions to limit the outward swing of the blocks 102A by engaging the operating lever 126A within a suitable recess 140A cut in the side of the operating lever.

In practically all other respects the structure shown in FIGS. 4A and 4B is identical and functions identically to the structure of FIGS. 3 and 4. There are certain other minor modifications relative to the structure of FIGS. 3 and 4. For example, the radially extending collar 142A of the post 141A has a somewhat greater axial dimension than the collar 95 of the post 96.

Oscillating System (Unit C)

Referring now more particularly to FIGS. 5 through 8, Unit C includes a base plate 130 which is fixed to the bolster plate 131 (FIG. 2) of the hydraulic press. Fixedly mounted upon the base plate 130 by means of suitable blocks 132 is the top plate 71 of Unit C. The top plate is spaced from the base plate in order to accommodate certain working parts to be described below of the oscillating system and also certain further parts of the above described means for clamping the driving element of the damper.

The top plate 71 is suitably bored to receive a bearing bushing 135 which absorbs the radial and thrust loads subjected thereto from the oscillating plate 101. The oscillating plate 101 is provided with a downwardly projecting boss 136 which is received within a suitable recess in an arm 137, the arm being keyed to the boss and secured to the top plate by means of suitable screws 140.

The arm 137 has mounted on one end thereof an air cylinder 141. The piston shaft 142 of the air cylinder extends downwardly therefrom and is pivotally secured to a pair of lever arms 145. The lever arms 145 are pivotally secured to a trunnion nut 146 to which the piston shaft 142 is fixed by means of a nut 147. The lever arms 145 are pivotally mounted at their other ends by means of trunnions 150 upon the sides of a trunnion nut 149 which is threadedly received and locked upon the downwardly extending end of the shaft 120 which, as has been described above, extends upwardly through the center post 96 for clamping the guide member 116 by means of the nut 117.

The lever arm 145 is also pivoted about pin 151 upon a fulcrum block 152 which is fixed to the arm 137 by means of suitable screws 155. Thus, it can be seen that, if the air cylinder 141 is actuated to move its piston shaft 142 downwardly, the lever arm 145 will pivot about the fulcrum pin 151 and will move the shaft 120 and the guide 116 downwardly to clamp the driving element 11 in proper position.

The arm 137 has an additional function besides providing a mounting for the air cylinder 141 and that is to transmit oscillation to the oscillating plate 101. The oscillating force is provided from an air cylinder 160 pivotally mounted by pin 158 on a block 159 which is fixed to the top plate 130, the air cylinder being operatively connected to the arm 137 by a suitable linkage to be described.

This linkage comprises a lever arm 161 which is secured by a key 162 and by bolts 163 to the arm 137. The lever arm 161 is pivoted by means of pin 165 to a link 166, the link 166 being pivoted by means of pin 167 to a further lever arm 170. The lever arm 170 is pivoted by means of a pin 171 to a boss 172 fixedly secured to one of the blocks 132.

The end portion 175 of the lever arm 170 is provided with a plurality of holes 176 for reception of pivot pin 177 which is used to pivotally secure the lever arm 170 to the piston shaft 180 of the air cylinder 160, the air cylinder being shown as secured to the centermost one of these holes 176. It should be understood that when either of the outermost holes 176 is used for mounting the piston shaft 180, the cylinder 160 will pivot about pin 158 to allow for such mounting.

It can be seen that, when the air cylinder 160 is used to reciprocate the end 175 of the lever arm 170 and when the piston rod 180 moves from one end of its stroke to the other, the oscillation delivered to the oscillating plate through the various links and levers may be adjusted by using a particular one of the holes 176 for the mounting of the rod 180. Thus, when the hole 176 closest to the pin 171 is used for such mounting, the amplitude of oscillation of the oscillating plate will be relatively high. When the hole 176 farthest from the pin 171 is so used, the amplitude of oscillation will be relatively low and when the centermost hole 176 is used, the amplitude of oscillation will have an intermediate value.

A master valve 184 is mounted upon the base plate 130 and is provided with a number of ports 185, 186, 187, 188, and 189. The port 186 is connected by means of a suitable conduit 190 to one end of the air cylinder 160. The port 188 is connected by means of a suitable conduit 191 to the other end of the air cylinder 160. Thus, when air under pressure is allowed to flow into one end of the air cylinder 160 through the conduit 190 and conduit 191 is opened to atmosphere, the piston rod 180 will be projected from the air cylinder and when air under pressure is allowed to flow through the conduit 191 into the other end of the air cylinder and the conduit 190 is opened to atmosphere, the piston rod 180 will be retracted within the air cylinder.

The master valve 184 is a conventional valve which is so constructed that when air pressure is provided at the port 185 by means of conduit 196 communicating therewith, ports 186 and 187 are connected with one another and ports 188 and 189 are connected with one another by suitable passages within the master valve. The valve 184 is so constructed that, when no pressure is provided to the port 185 by the conduit 196 being vented to atmosphere, ports 187 and 188 are connected with one another and ports 186 and 189 are connected with one another.

A pair of valves 200 and 201 are fixedly mounted upon the base plate 130 by means of a mounting plate 199 and are provided with a pair of plungers 202 and 203 arranged to be actuated by means of projecting elements 205 and 206, respectively, which extend oppositely from a plate 207 fixed to the link 166. The valves 200 and 201 are so positioned that, when the link 166 is finishing a stroke in one direction or the other as a result of being reciprocated by the air cylinder 160, the plungers 202 and 203 will be engaged and actuated.

The valve 201 is arranged to control flow of air under pressure between its port 201A (FIG. 7), which is open to atmosphere, and a conduit 201B which communicates between the valve 201 and a T-connection 201C connecting the conduit 201B to the conduit 196. The valve 201 is constructed in such a manner that it is open only when the plunger 203 is depressed. The valve 200 is arranged to control flow of air under pressure between conduits 200A and 200B connected to the two ports of the valve 200. This valve is so constructed that it is open only when its plunger 202 is depressed.

A suitable conduit 208 is connected to the conduit 200A and to conduit 209 by means of a T-connection 210. The conduit 209 is arranged to provide communication between the T-connection 210 and the port 187 of the master valve. It should be noted that the port 189 is open to atmosphere and therefore, when the port 189 is connected either to the port 186 or 188 by operation of the master valve, one or the other ends of the cylinder 160 is vented to atmosphere.

Assume now that air under pressure is being supplied to the conduit 208 and that the air is flowing from the conduit 208 through the conduit 209, master valve 184, and conduit 190 to the air cylinder 160. In this manner air pressure will be supplied through the conduit 190 to one side of the piston of the air cylinder causing the piston rod 180 to be extended, the other side of the piston being vented to atmosphere through the conduit 191 and master valve.

As the piston rod 180 nears the end of its outward stroke, the lever 170 will have moved the link 166 to a position wherein the plunger 203 of the valve 201 is depressed, opening the valve and allowing the pressure within the conduits 200B, 201B, and 196 to be vented to atmosphere, thus causing the pressure at the port 185 of the master valve to be reduced to atmospheric pressure. In this manner the master valve is reversed and the valve provides communication between the port 187 and the port 188 and also provides communication between the port 186 and the port 189. The air under pressure within the conduit 209 now flows into the opposite end of the air cylinder through the conduit 191, causing the piston rod 180 to reverse its direction and to move rightwardly as viewed in FIG. 8, the rightward end of the air cylinder being vented to atmosphere through the conduit 190 and master valve.

As the piston rod 180 moves into the air cylinder, the lever arm 170 pivots about the pin 171, causing the link 166 to be moved leftwardly and, at the end of the stroke, causing the projection 205 to engage and depress the plunger 202 of the valve 200. Depression of the plunger 202 opens the valve 200 and allows air under pressure to enter the conduits 200B, 201B, and 196 from the conduits 208 and 200A. Since the valve 201 is closed inasmuch as its plunger is not depressed, the pressure in conduits 200B, 196, and 201B remains even though valve 200 again closes.

As described above, the master valve is so constructed that, when air pressure is again delivered to the port 185 from the conduit 196, the air flowing into the port 187 from the conduit 209 is diverted so that it ceases to flow out of the port 188 and again flows from the port 186, reversing the movement of the piston rod 180. As has been explained, when the ports 187 and 186 are connected by the master valve, the ports 188 and 189 are also connected by the master valve whereby the leftward end of the air cylinder is vented to atmosphere. It can be seen that as long as air pressure is supplied to the conduit 208, the air cylinder will cause reciprocation of the piston 180 and will cause oscillation of the oscillating plate 101 as a result of the movement of the linking members 170, 166, 161, and 137.

The air supply to the conduit 208 is controlled by means of a conventional regulator valve 211 (illustrated somewhat schematically in FIG. 8) which makes possible the control of the speed of oscillation of the oscillating plate 101 and also of the torque exerted by the oscillating plate, the regulator functioning to provide a desired pressure to the conduit 208. When the regulator 211 is at its fully opened position, air pressure is allowed to freely flow into the conduit 208, causing the piston rod 180 to be reciprocated at a high rate of speed and to exert a high amount of force upon the oscillating plate through the various linking members. When the regulator 211 is set to decrease the air flow to the conduit 208, the speed of the reciprocation of the piston shaft and the force exerted by the shaft upon the lever 170 and, in turn, upon the oscillating plate is reduced. Thus, it can be seen that the regulator 211 in combination with the above described structure provides means for controlling the torque and speed of oscillation of the driving element 11, while the various holes 176 provide a means for controlling the amplitude of oscillation of the driving element.

The present apparatus is constructed in such a manner that the action of the punch in forcing the elastic member between the driving and inertia members occurs simultaneously with the oscillation of the driving member. The ram 26 is equipped with an adjustable dog which opens a further air valve (not shown) on the downward stroke of the ram and closes it on the upward stroke. This air valve is arranged to start the oscillating motion of the oscillating plate 101 so that it continues during the forcing of the elastic element into place. The apparatus is arranged in such a manner that the oscillation continues for a dwell period while the ram is at the end of the downstroke in order to remove all localized strain or stress in the elastic element.

The top plate 71 is provided with an annular piloting recess for reception of the oscillating plate 101. This recess also positions the body 70 (see FIG. 3) which has a downwardly extending boss 215 received within the recess. As has been pointed out above, the top plate 71 is provided with a passage 97 which communicates air pressure through recess 100 and passages 102 to the lifting plate 76 whereby the completed damper assembly may be moved upwardly or ejected from the lower portion of Unit B. A suitable air conduit is provided for communicating air pressure to the passage 97 and is controlled by means of a conventional three-way manually manipulated valve (not shown). This valve is so arranged that, in one position it supplies air to the air cylinder 141 for clamping the driving element 11 in proper position for damper assembly. The valve may be moved to a second position wherein it allows no air to pass and may be arranged in a third position wherein air pressure is admitted to the passage 97 to raise the lift ring 76.

From the above description it will be obvious that the present invention provides an improved apparatus for assembling a damper, the apparatus being capable of assembling dampers of different contours and sizes. It can also be seen that the present invention provides an apparatus for assembling a damper which includes means for alternatively clamping the inner ring of the damper and ejecting the assembled damper from the apparatus. Further, it can be seen that the present invention provides efficient and easily manufactured means for positioning and supporting the outer sleeve of the damper in concentric relation to the inner sleeve thereof.

It should be understood that the present apparatus is capable of assembling dampers having a curved spacing between the spaced rings, such as the damper disclosed in the copending application of William J. Troyer entitled Torsional Vibration Damper, Serial Number 662,842, now Patent No. 2,972,904. The apparatus is also capable of assembling dampers having an elliptically shaped spacing between the rings or sleeves such as is disclosed in the copending application of William J. Troyer entitled Elliptical Vibration Damper, Serial Number 743,893, now Patent No. 2,948,129. It should also be noted that the annular elastic element used with the apparatus can have an initial radially extending shape or an initial axially extending shape.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. Apparatus for assembling an elastic member in a compressed state between a pair of spaced members having coaxial surfaces, comprising supporting means for each of said spaced members for positioning them in spaced relation, means for aligning said elastic member with the space between said spaced members and for guiding said elastic member into said space, a punch engageable with said elastic member for forcing it between said spaced members, one of said supporting means being pivotal with respect to the other of said supporting means and about the axes of said surfaces, a link pivotally secured to said one supporting means, a lever pivoted about a point fixed with relation to said other supporting means and pivoted to said link, a fluid operated reciprocating motor arranged to oscillate said lever and to oscillate said one supporting means with respect to said other supporting means, means for controlling the amount of fluid delivered to said motor for controlling the speed and torque of oscillation, and means for changing the moment arm of said motor in acting on said lever for controlling the amplitude of oscillation.

2. Apparatus for assembling an elastic bushing in a compressed state between a pair of spaced concentric sleeves, comprising a base, means carried by said base for seating and centering the outer sleeve, an inner oscillating fixture rotatably mounted on said base for centering the inner sleeve in spaced relation to the outer sleeve and for transmitting oscillation to said inner sleeve, a clamping element for securing said inner sleeve to said oscillating fixture and adapted to receive the bushing thereabout for positioning said bushing in alignment with the space between said sleeves, a punch ring arranged to engage one end of the bushing and to force it axially between said sleeves, a link pivotally secured to said oscillating fixture, a lever pivoted on said base and pivoted to said link, a fluid operated reciprocating motor arranged to oscillate said lever and thereby oscillate said inner oscillating fixture, means for controlling the pressure of the fluid delivered to said motor for controlling the speed and torque of oscillation, and means for changing the moment arm of said motor in acting on said lever for controlling the amplitude for oscillation.

3. Apparatus for assembling an elastic member in a compressed state between a pair of spaced concentric sleeves, comprising a base having a recess, a plurality of supporting blocks received within said recess for centering the outer sleeve, an inner oscillating fixture rotatably mounted on said base for seating and centering the inner sleeve, said blocks being arranged in a concentric pattern about said oscillating fixture and each being mounted upon said base in such a manner as to be movable inwardly to seat and center said outer sleeve, means for moving said blocks inwardly to seat and center said outer sleeve, a clamping element for securing said inner sleeve to said oscillating fixture and adapted to receive the bushing thereabout for positioning said bushing in alignment with the space between said sleeves, a punch ring arranged to engage one end of the bushing and to force it axially between said sleeves, means for oscillating said fixture for effecting oscillation of one of said sleeves relative to the other sleeve simultaneously with the axial force applied to said bushing, said means for oscillating being adjustable to oscillate said fixture at a desired torque, speed and amplitude.

4. Apparatus for assembling an elastic member in a compressed state between a pair of spaced concentric sleeves, comprising a base having a recess, a plurality of supporting blocks received within said recess for seating and centering the outer sleeve, an inner oscillating fixture rotatably mounted on said base for centering the inner sleeve, said blocks being arranged in a concentric pattern about said oscillating fixture and each being mounted upon said base in such a manner as to be movable inwardly to seat and center said outer sleeve, a clamping element for securing said inner sleeve to said oscillating fixture and adapted to receive the bushing thereabout for positioning said bushing in alignment with the space between said sleeves, a punch ring arranged to engage one end of the bushing and to force it axially between said sleeves, a link pivotally secured to said oscillating fixture, a lever pivoted on said base and pivoted to said link, a fluid operated reciprocating motor arranged to oscillate said lever and thereby oscillate said inner oscillating fixture, means for controlling the fluid delivered to said motor for controlling the speed and torque of oscillation, and means for changing the moment arm of said motor in acting on said lever for controlling the amplitude of oscillation.

5. The apparatus defined in claim 3 in which the means for moving said blocks inwardly comprises an annular cam received in said recess, each of said blocks being pivoted on said base in such a manner as to be swingable inwardly to seat and center said outer sleeve, said blocks each having a roller rotatably mounted thereon, said cam being positioned over said blocks and having a plurality of straight elongated recesses extending completely through said cam and defining camming surfaces, said rollers extending upwardly from said blocks into said recesses, and means for rotating said cam within said recess for moving said blocks inwardly and outwardly.

6. Apparatus for assembling an elastic bushing in a compressed state between a pair of spaced concentric sleeves, comprising a base having a recess, a plurality of supporting blocks received within said recess for seating and centering the outer sleeve, an inner oscillating fixture rotatably mounted on said base for centering the inner sleeve in spaced relation to the outer sleeve and for transmitting oscillation to said inner sleeve, an annular lift ring received about said oscillating fixture and arranged to support said inner sleeve, said base having a cylindrical aperture the axis of which extends upwardly and within which said lift ring is closely fitted, said base having passages leading into said aperture below said lift ring whereby air under pressure may be conducted to said lift ring to cause it to raise said inner sleeve, said blocks being arranged in a concentric pattern about said oscillating fixture and each being pivoted upon said base in such a manner as to be swingable inwardly to seat and center said outer sleeve, said blocks each having a roller rotatably mounted thereon, an annular cam received within said recess being positioned over said blocks and having a plurality of straight elongated recesses extending completely through said cam and defining camming surfaces, said rollers extending upwardly from said blocks into said recesses, means for rotating said cam within said recess for moving said blocks inwardly and outwardly, a clamping element for securing said inner sleeve to said oscillating fixture and adapted to receive the bushing thereabout for positioning said bushing in alignment with the space between said sleeves, a punch ring arranged to engage one end of the bushing and to force it axially between said sleeves, a link pivotally secured to said oscillating fixture, a lever pivoted on said base and pivoted to said link, a fluid operating reciprocating motor arranged to oscillate said lever and thereby oscillate said inner oscillating fixture, means for controlling the fluid pressure delivered to said motor for controlling the speed and torque of oscillation, and means for changing the moment arm of said motor in acting on said lever for controlling the amplitude of oscillation.

7. Apparatus for assembling an elastic bushing in a compressed state between a pair of spaced concentric sleeves, comprising a base, means carried by said base for seating and centering the outer sleeve, an inner oscillating fixture rotatably mounted on said base for centering the inner sleeve in spaced relation to the outer sleeve and for transmitting oscillation to said inner sleeve, a lift ring received about said oscillating fixture and arranged to support said inner sleeve, said base having passages leading below said lift ring whereby fluid under pressure may be conducted to said lift ring to cause it to raise said inner sleeve, a clamping element for securing said inner sleeve to said oscillating fixture and adapted to receive the bushing thereabout for positioning said bushing in alignment with the space between said sleeves, said clamping element extending downwardly through said oscillating fixture, a fluid operated motor arranged to operate on the downwardly extending portion of said clamping element to hold it downwardly for clamping said inner sleeve, valve means arranged to supply fluid alternatively to said fluid motor and to said passages, a punch ring arranged to engage one end of the bushing and to force it axially between said sleeves, and means for oscillating said oscillating fixture simultaneously with the application of axial force to said bushing.

References Cited in the file of this patent

UNITED STATES PATENTS

| | | |
|---|---|---|
| 2,330,047 | Godsey | Sept. 21, 1943 |
| 2,565,460 | Woodlief | Aug. 21, 1951 |
| 2,623,395 | White | Dec. 30, 1952 |
| 2,736,296 | Romine | Feb. 28, 1956 |
| 2,751,822 | Schiltz | June 26, 1956 |
| 2,756,546 | Barhorst | July 31, 1956 |
| 2,761,405 | Moller | Sept. 4, 1956 |
| 2,768,431 | Hughes | Oct. 30, 1956 |